UNITED STATES PATENT OFFICE.

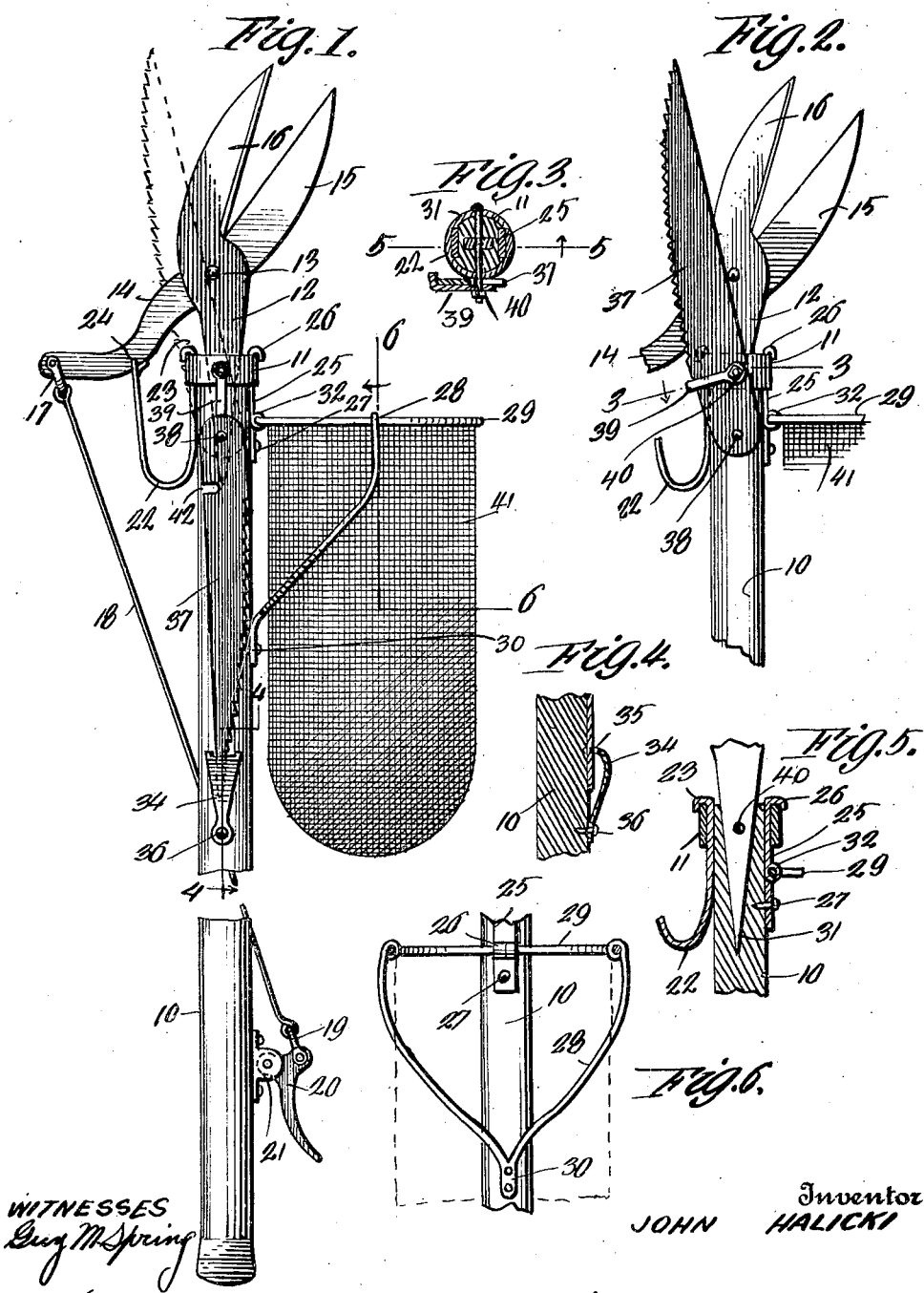

JOHN HALICKI, OF DUNKIRK, NEW YORK.

FRUIT-GATHERER AND TREE-TRIMMER.

1,370,208. Specification of Letters Patent. Patented Mar. 1, 1921.

Application filed December 23, 1919. Serial No. 346,917.

*To all whom it may concern:*

Be it known that I, JOHN HALICKI, a citizen of the United States, residing at Dunkirk, in the county of Chautauqua and State of New York, have invented certain new and useful Improvements in Fruit-Gatherers and Tree-Trimmers, of which the following is a specification.

This invention relates to a fruit gatherer and tree trimmer and has for its primary object to provide a device of this character wherein the fruits of trees and the like can be conveniently cut therefrom and also the device employed for the cutting is provided with a basket for gathering the fruit.

A still further object is to provide a staff for extending the cutting mechanism and the basket to a considerable height and to provide means for operating the cutting mechanism from a point adjacent the lower end of the staff.

A still further object of this invention is the provision of a trimming mechanism particularly for fruit trees wherein the trimming may be performed by the operator while standing on the ground and the trimming saw may be placed in a convenient position so as to be out of the way of the other part of the device when the trimming knife is not in use.

With these and other objects in view, my invention comprehends an improved fruit gatherer and tree trimmer that embodies the peculiar construction and novel combination of parts all of which will be hereinafter fully explained, specifically pointed out in the appended claims and illustrated in the accompanying drawings.

In the drawings—

Figure 1 is a side elevation of my invention.

Fig. 2 is a fragmentary side elevation of the upper portion of my invention showing the trimming saw in an operative position.

Fig. 3 is a section taken on the line 3—3 of Fig. 2.

Fig. 4 is a section taken on the line 4—4 of Fig. 1.

Fig. 5 is a section taken through the upper portion of the staff and more particularly on line 5—5 of Fig. 3 and Fig. 6 is a section taken on the line 6—6 of Fig. 1 looking in the direction of the arrow.

Referring to the accompanying drawing by numerals, it will be seen that 10 designates an elongated staff which is provided at its upper end with a collar 11 for a purpose to be hereinafter more fully described. A shearing member is situated upon the upper portions of the staff so that the shank 12 which is provided with the lower portion 31 is inserted in a V-shaped slot provided in the upper portion of the staff 10 as is clearly shown in Fig. 5 of the drawing. This point 31 is held in the V-shaped slot by means of the bolt 40. The shank 12 is provided with the cutting jaw 16 which is pivoted to another jaw 15 by means of the rivet 13. The jaw 15 is operated by means of the shank 14 which is of a substantial L-shape and is provided at its extremity with an eye.

A rod 18 having a loop at each end is connected to the eye provided in the shank 14 by means of the link 17. The other end of the rod 18 is provided with a link 19 so as to be connected to the manipulating lever 20 which is pivoted in the bracket 21 as is clearly shown at the bottom of Fig. 1 of the drawing. A U-shaped spring 22 is attached to the top portion of the staff by means of the hook portion 23 extending over and under the collar 11. The other end of this U-shaped spring 22 is attached to the shank 14 by passing through the eye 24. The spring 22 normally holds the jaws 15 and 16 in an open position from which it will be seen that by pressing upon the manipulating lever 20 the rod 18 will be pulled so as to move the shank 14 downwardly, thereby closing the jaw 15.

A net basket 41 is carried upon the upper portion of the shaft and has the supporting flange 29. A bracket 25 passing under the collar 11 and provided with the hook 26 has an eye 32 which is formed by bending the body of the bracket 25 so as to receive the supporting band 29. This bracket 25 extends below the band and is attached to the upper portion of the shaft by means of a rivet or some other suitable means 27. A brace 28 provided with the plate 30 which is attached to the staff 10 by means of a rivet and is of a substantially V-shape and has its arms extending from the staff at an acute angle for a distance and then bent so as to extend parallel with the staff and to form eyes at their extremities so as to receive the band 29. This construction is clearly shown in Fig. 6 of the drawing and also in Fig. 1. It will be seen also that the basket 41 is positioned below the jaws 15 and 16 so that the fruit cut thereby will normally fall into the basket.

The saw 37 which is especially adapted to be used for trimming purposes is pivotally mounted upon the upper portion of the staff 10 by means of a rivet or some other suitable means 38. This saw 37 is provided with the usual teeth and adjacent its pivot point with a slot 42 for engaging the bolt 40 when the saw is in an operative or extended position. A hook 39 is also pivoted upon the bolt 40 and held thereon by means of a nut. This hook is to be formed of sufficiently resilient material so that same will snap over the edge of the saw opposite the one upon which is provided the slot 42 as is clearly shown in Fig. 2 of the drawing, wherein the slot 42 is in engagement with the bolt 40 while the hook 39 engages the opposite edge of the saw thereby holding the saw in an operative position. When it is not desired to use the saw, hook 39 is lifted from out of engagement with the edge of the saw so as to allow the saw to swing so as to lie alongside of the staff 10 as is shown in Fig. 1. A clip 34 attached to the staff by means of a rivet or nail 36 is provided so as to engage the point of the saw 37 for holding same in a fixed position. This clip 34 is bent outwardly and then inwardly toward the staff and is bifurcated adjacent the end so as to form a slot 35 for receiving the pointed end of the saw 37, as is clearly shown in Fig. 4 of the drawing.

Having thus fully described my invention, what I claim as new is:—

In a device of the class described, the combination of a staff provided with shears at its upper end, means for operating said shears; of a basket, a band provided upon the upper portions of said basket, a bracket comprising an elongated body bent so as to form an eye, a ferrule situated upon the upper end of said staff, the body portion of said bracket passing around said ferrule and provided with a hook at its end so as to overhang said ferrule, a V-shaped brace fixedly attached to said staff, the arms of said brace extending at an acute angle from said staff and provided at their extremities with sleeves for receiving said band.

In testimony whereof I affix my signature in presence of two witnesses.

JOHN HALICKI.

Witnesses:
FRANK NIEDZWIECKI,
ELIZABETH SCHUBARGA.